United States Patent [19]
Luxon

[11] Patent Number: 5,950,550
[45] Date of Patent: Sep. 14, 1999

[54] SHAFT ROTATION INDICATOR CLIP

[75] Inventor: Gary Deloy Luxon, Moline, Ill.

[73] Assignee: Deere & Company, Moline, Ill.

[21] Appl. No.: 09/205,907

[22] Filed: Dec. 4, 1998

[51] Int. Cl.⁶ ...................................................... A01C 7/00
[52] U.S. Cl. ........................... 111/177; 111/200; 111/903
[58] Field of Search .................................. 111/903, 904, 111/177, 200; 172/430

[56] References Cited

U.S. PATENT DOCUMENTS

| | | | |
|---|---|---|---|
| 3,974,377 | 8/1976 | Steffen | 250/222 R |
| 4,179,938 | 12/1979 | Schramm . | |
| 4,875,421 | 10/1989 | Hadley | 111/200 |
| 4,875,635 | 10/1989 | Steltzer . | |
| 4,892,157 | 1/1990 | Gemar | 172/430 |

*Primary Examiner*—Christopher J. Novosad

[57] ABSTRACT

A seeding implement adapted to be towed forwardly over the ground is provided with a seed meter coupled to a material hopper for receiving seed. The seed meter is driven by a drive shaft for dispensing seed to a furrow at a rate determined by a rate of rotation of the drive shaft. An indicia bearing member is releasably secured to the drive shaft for rotation therewith. The indicia bearing member includes two side legs secured to the drive shaft and a reflective portion connected to the side legs, said reflective portion extending along an axis of the drive shaft for indicating rotation of the drive shaft to an operator.

16 Claims, 2 Drawing Sheets

SHAFT ROTATION INDICATOR CLIP

BACKGROUND OF THE INVENTION

1. Field of the Invention

The present invention relates to seeding apparatus, and more particularly to devices for indicating the rotation of a seed meter drive shaft. A preferred embodiment relates to an indicia bearing member removably secured to such a drive shaft so that an operator may easily determine whether the shaft is rotating and seed is being dispensed.

2. Description of Related Art

Seeding implements such as grain drills and planters commonly use a drive shaft to turn a fluted feed cup seed meter. These drive shafts may be of various cross-sectional configurations (e.g., round, square or hexagonal). The drive systems of these implements commonly provide some type of shear protection (a shear pin, for example) to prevent serious damage to the shaft or other drive components in case of overload. The drive system typically involves roller chain and sprockets which may disengage due to crop residue. The operator may not detect that his drive shaft has stopped turning and the seeding implement is no longer seeding. The drive shaft for a seeding implement is typically difficult to see, particularly from an operator's seat on a tractor towing the seeding implement, as the shaft is typically relatively thin, may be painted the same color as the seed meter and seed box, and may be obscured to the operator by dust. Many seeding implements manufactured today are equipped with an electronic seed sensor system which would warn the operator if the drive shaft was no longer turning. However, many other presently manufactured seeding implements as well as older seeding implements are not equipped with seed sensors, as such sensors represent substantial expense.

A commonly used remedy to assist an operator in determining whether a drive shaft is rotating is to tie a rag around the shaft so that it will rotate with the shaft. These rags too may be difficult to see, especially in a dusty environment or during evening or nighttime operation.

An object of the invention is to provide indicia of rotation for a drive shaft. Another object is to provide such indicia on member which may be inexpensively manufactured and may be removably secured to the shaft.

SUMMARY OF THE INVENTION

These and other objects are achieved by the present invention wherein a shaft rotation indicator is configured as a thin clip and is adapted for attachment to a drive shaft. The indicator provides a relatively large surface (as compared to the surface of the shaft) to attach indicia such as a reflective strip. The clip is manufactured from a resilient material which tends to return to its original shape after it is deflected, most preferably a spring steel or stainless steel, which are particularly well suited for this application. A preferred embodiment of the clip has three surface planes. The front plane is used to support a strip of reflective material. The other two planes are configured as side legs which depend from the front plane and each have an open notch that will fit over the drill shaft when the side legs are deflected to a position generally perpendicular to the front plane. The notch has a narrow opening at its front edge which just exceeds the size of the shaft. The notch opening then steps wider-forming an upturned portion that catches the side of the shaft once the strip is no longer deflected. Preferably, the shape of the notch will complement the shape of the shaft. The notch leg is located away from the front surface if the side legs are (deflected closer to install on the shaft-divergent) and towards the front surface if deflected apart to install on the shaft.

The reflective surface will provide improved visibility of the drive shaft, especially at night or in dusty conditions. The spring clip cost is very low compared to an electronic sensor system. Also, the clip can be installed without removing the drill shaft. Further, the clip is self-locking and can be placed onto the shaft without the use of tools. In addition, the clip can be installed at different locations along the shaft and can be easily repositioned by the operator for maximum visibility. The clip can be installed on square, hex, or round shafts and the shape of the notches on the side legs may be varied accordingly.

DETAILED DESCRIPTION

Figure 1:
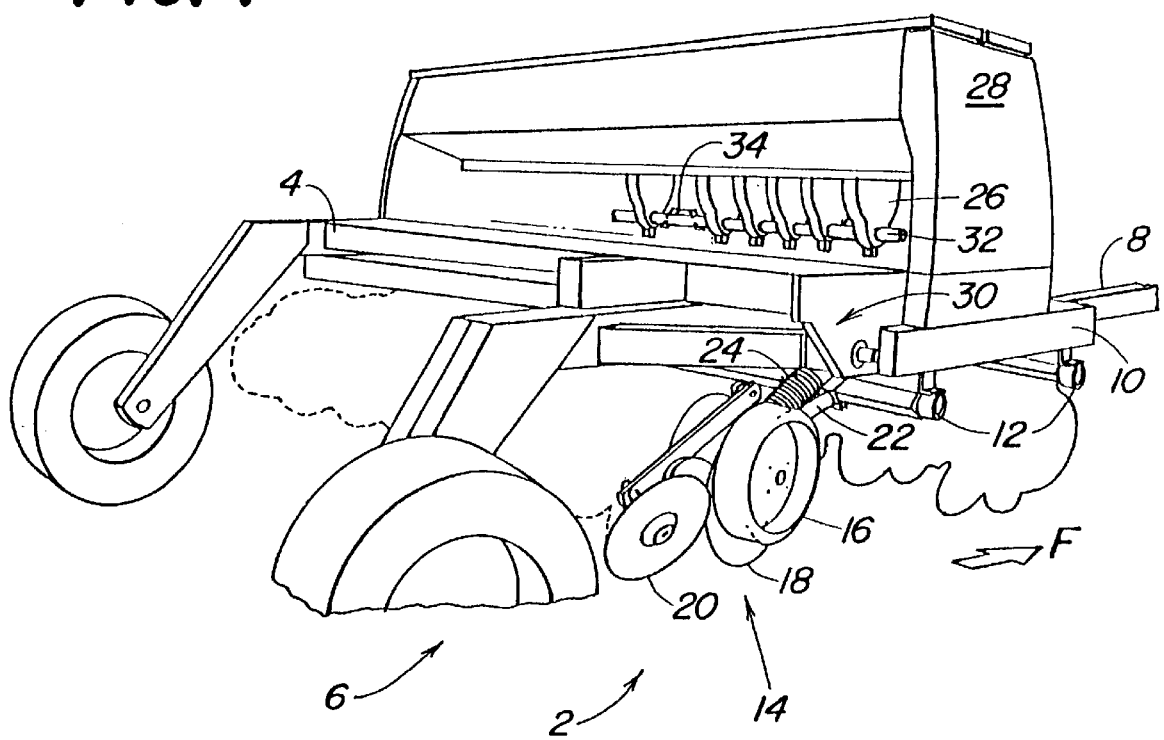
FIG. 1 is a perspective view of a shaft rotation indicator clip according to the present invention mounted on the meter drive shaft of a grain drill.

Referring to FIG. 1, there is shown a seeding implement 2 having a main frame 4 supported by ground wheel assemblies 6. A front hitch structure 8 is connected to the frame 4 and is adapted for attachment to a vehicle such as a tractor (not shown) for towing the implement 2 in the forward direction (F). The frame 4 includes transversely outermost frame Ends 10 and supports toolbars 12 between the frame ends 10. Tool assemblies 14 are fixed to the toolbars 12 and are rockable therewith between raised transport positions and lowered ground-engaging positions. The tool assemblies 14 are generally uniformly spaced substantially the entire width of the implement between the frame ends 10. As shown, the tool assemblies 14 are minimum tillage opener assemblies including a gauge wheel 16, an angled disk opener 18 and a press wheel 20 supported on an arm 22 connected to the toolbar 12 and biased downwardly by a spring 24. A seed boot assembly (not shown) located closely adjacent the disk opener 18 is connected to a hose extending from a seed meter 26 carried at the lower portion of a transversely extending hopper 28 located on the frame 4. A meter drive assembly 30 is located on the ground wheel assembly 6 and is drivingly connected through a drive shaft 32 to the seed meters 26 for supplying seed or other granular material to the tool assemblies 14 at a rate corresponding to the rate of rotation of the drive shaft 32, which as shown is proportional to the ground speed of the implement 2.

A shaft rotation indicator 34 is secured over the drive shaft 32 and rotates with the drive shaft 32 to demonstrate rotation of the shaft 32 to an operator. As the implement 2 is towed forwardly over a field, the wheel assembly 6 rotates the metering devices in the seed meters 26. Seed is metered to the furrows opened by the disk openers 18 at a rate proportional to the ground speed.

Figure 2:
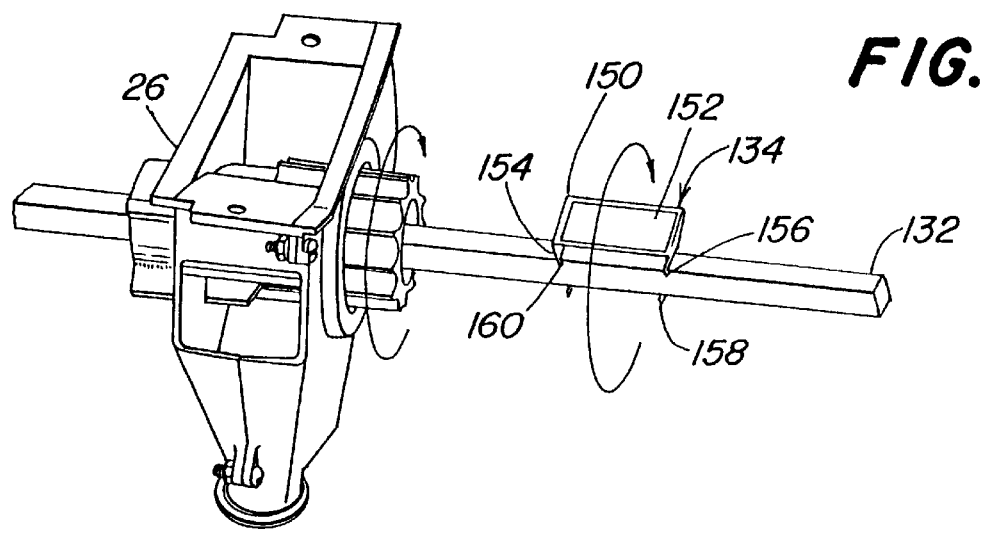
FIG. 2 is a perspective view of a portion of the drive shaft of FIG. 1 fitted with an indicator clip having normally convergent side legs.

The shaft rotation indicator 34 is configured as a thin clip, preferably made of a resilient and durable material such a spring steel. As shown in FIG. 2, a shaft rotation indicator 134 has a front plane surface 150 upon which indicia such as reflective tape 152 is fixed so that the front plane surface 150 acts as a reflective portion of the indicator 134. First and second side legs 154, 156 depend from the front plane surface 150 and each of the side legs 154, 156 has a notch 158 for receiving a drive shaft 132 and providing frictional engagement therewith. When the indicator 134 is mounted on the drive shaft 132, a positive engagement is achieved by a stepped portion 160 of the notch 158. The indicator 134 is shown mounted over a drive shaft 132 which is square in cross-section.

Figure 3:
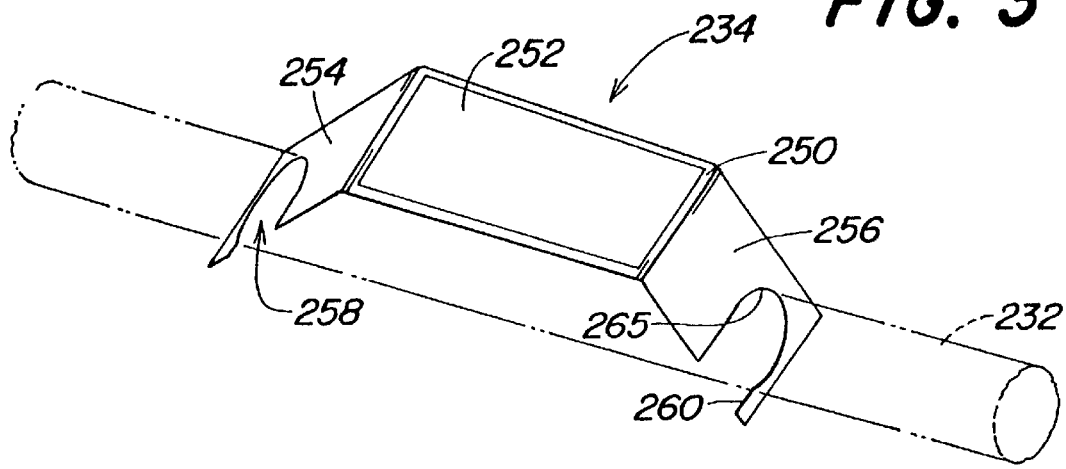
FIG. 3 is a perspective view of an indicator clip having normally divergent side legs mounted on a round shaft.

A shaft rotation indicator 234 is shown in FIG. 3 mounted on drive shaft 232 which is circular in cross section. The indicator 234 is similar to the indicator 134 of FIG. 2 in that it comprises a front plane surface 250 provided with reflective tape 252, and first and second side legs 254, 256 having notches 258 for securing the indicator to a drive shaft 232. There are three notable differences between the indicator 234 of FIG. 3 and the embodiment of the indicator 134 shown in FIG. 2. First, an inner contour 265 of the notch 258 is rounded to complement the circular shape of the drive shaft 232 whereas the notch 158 is complementary to a square drive shaft 132. Second, the side legs 254, 256 are divergent from the front plane surface 250 whereas the side legs 154, 156 of the indicator 134 are convergent. Third, a stepped portion 260 of the notch 258 is directed toward the front plane surface 250 while the stepped portion 160 is directed away from the front plane surface 150. This difference is related to the convergence or divergence of the side legs 154, 156 and 254, 256 respectively. The stepped portion 160 of a notch 158 for an indicator 134 whose legs 154, 156 are convergent is preferably directed from a proximal portion of the notch away from the front plane surface 150 to effect a more secure connection to the drive shaft 132. In contrast, mating of the drive shaft 232 and the indicator 234 whose side legs 254, 256 are divergent is more secure where the stepped portion 260 is directed from a distal portion of the notch toward the front plane surface 250.

Figure 4:
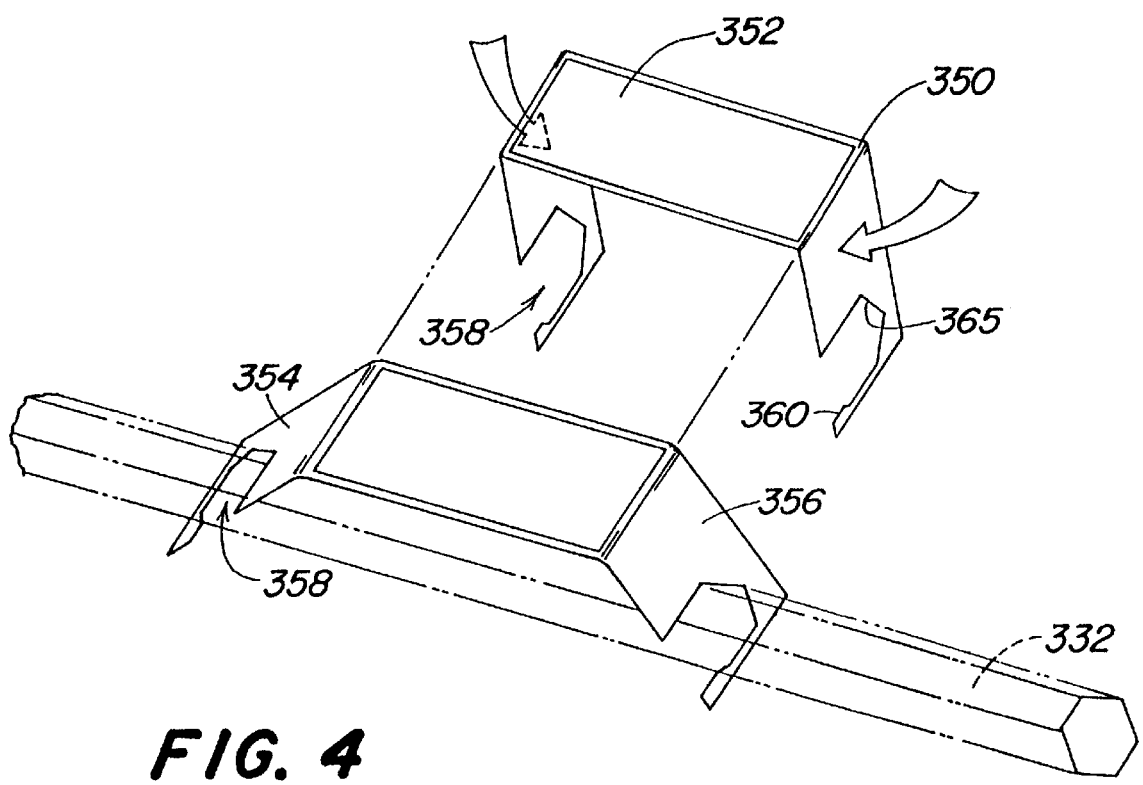
FIG. 4 is a perspective view of an indicator clip having normally divergent side legs mounted on a hexagonal shaft.

FIG. 4 shows a shaft rotation indicator 334 similar to the indicator 234 of FIG. 3 in that its side legs 354, 356 are divergent from the front plane surface 350 (to which reflective tape 352 is fixed) and a stepped portion 360 of a notch 358 is directed toward the front plane surface 350. However, an inner contour 365 of the notch 358 is configured to complement a hexagonal drive shaft 332. FIG. 4 illustrates the process for securing the indicator 334 to the shaft 332. The side legs 354, 356 are deflected inwardly (in the direction of the arrows) from their normal divergent positions toward perpendicular with respect to the front plane surface 350 so that the size of the notch 358 as seen by the shaft 332 is enlarged. The indicator 334 may then be slid over the drive shaft 332, just clearing the stepped portion 360. When the shaft 332 is received in the notch 358, the side legs 354 are allowed to return to their normal divergent positions, reducing the size of the notch 358 as seen by the drive shaft 332 and providing a frictional engagement between the indicator 334 and the shaft 332. Removal of the indicator 334 may be accomplished by deflecting the side legs 354, 356 inwardly until sufficient clearance is obtained to pass the shaft 332 out of the notch 358 past the stepped portion 360. When the indicator 334 is secured to the shaft 332 The stepped portion 360 will provide a positive locking engagement since the side legs 354, 356 must be made essentially perpendicular to the shaft 332 to provide clearance sufficient for the shaft 332 to be removed from the notch 358 past the stepped portion 360. The indicator may easily be repositioned by deflecting the side legs 354, 356 inwardly to relieve frictional engagement so that the indicator 334 may be slid along the axis of the shaft 334.

The indicators 34, 134, 234 of FIGS. 1–3 may be similarly secured to and removed from their respective drive shafts 32, 132, 234, except that the convergent side legs 154, 156 of the indicator 134 of FIG. 2 must be spread apart to achieve a position generally perpendicular to the drive shaft 132 so that the drive shaft 132 will pass into the notch 158 past the stepped portion 160.

Although the invention is described with reference to a preferred embodiment on a seeding implement, it will be understood by those skilled in the art that the invention may be advantageous in other applications wherein it is desirable for an operator to be informed as to whether a shaft is rotating.

The present invention should not be limited by the above-described embodiments, but should be limited solely by the claims that follow.

We claim:

1. A seeding implement adapted to be towed forwardly over the ground, comprising:

a frame extending transversely to the forward direction;

an opener supported by the frame for opening a furrow into which seed is dispensed;

a material hopper supported by the frame;

a drive shaft supported by the main frame for rotation relative thereto;

a seed meter coupled to the material hopper for receiving seed therefrom, said seed meter driven by the drive shaft for dispensing seed to the furrow at a rate determined by a rate of rotation of the drive shaft; and an indicia bearing member releasably secured to the drive shaft for rotation therewith, said indicia bearing member including two side legs secured to the drive shaft and a reflective portion connected to the side legs, said reflective portion extending along an axis of the drive shaft for indicating rotation of the drive shaft to an operator.

2. The seeding implement of claim 1 wherein the side legs of the indicia bearing member are resilient and each of the side legs has a notch for receiving the drive shaft.

3. The seeding implement of claim 2 wherein each of the two resilient side legs of the indicia bearing member are biased toward a position oblique to the shaft, and the side legs may be temporarily deflected toward perpendicular with respect to the drive shaft for mounting the indicia bearing member to the drive shaft by placing the drive shaft in the notch of each of the two side legs.

4. The seeding implement of claim 1 wherein the reflective portion of the indicia bearing member is a planar surface extending generally parallel to the axis of the shaft.

5. The seeding implement of claim 4 wherein reflective tape is affixed to the flat surface to form the reflective portion.

6. The seeding implement of claim 1 wherein the notches in the side legs of the indicia bearing member have an inner contour which is complementary to a cross-sectional shape of the drive shaft.

7. A releasable shaft rotation indicator for mounting on a drive shaft of a seeding implement for confirming shaft rotation to an operator, said indicator comprising:

first and second side legs, each having a notch for receiving the seeding implement drive shaft and providing frictional engagement therewith;

a reflective portion connected to the side legs and extending generally parallel to an axis of the drive shaft; and a stepped portion extending into the notch for establishing a positive locking engagement of the indicator to the shaft.

8. The indicator of claim 7 wherein the notch has an inner contour which is complementary to the cross-section of the drive shaft.

9. The indicator of claim 8 wherein the inner contour is semi-circular for mounting the indicator over a drive shaft having a circular cross-section.

10. The indicator of claim 8 wherein the inner contour has at least two 90 degree interior angles for mounting the indicator over a square shaft.

11. The indicator of claim 8 wherein the inner contour has at least three 60 degree interior angles for mounting the indicator over a hexagonal shaft.

12. The indicator of claim 7 wherein the reflective portion is a generally planar surface upon which reflective tape is affixed.

13. The indicator of claim 7 wherein the side legs are convergent as they extend from the reflective portion.

14. The indicator of claim 13 wherein the stepped portion extends into the notch away from the reflective portion.

15. The indicator of claim 13 wherein the stepped portion extends into the notch toward from the reflective portion.

16. The indicator of claim 7 wherein the side legs are divergent as they extend from the reflective portion.

* * * * *